US008328616B1

(12) United States Patent
Gomez et al.

(10) Patent No.: US 8,328,616 B1

(45) Date of Patent: Dec. 11, 2012

(54) GAMING SYSTEM AND METHOD WITH AWARD ENHANCING SYMBOL

(75) Inventors: Benjamin T. Gomez, Chicago, IL (US); Daniel P. Louie, Chicago, IL (US); Pamela S. Smith, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/162,400

(22) Filed: Jun. 16, 2011

(51) Int. Cl.
*A63F 13/00* (2006.01)

(52) U.S. Cl. ........................................... 463/16; 463/20

(58) Field of Classification Search ............. 463/25–42, 463/16–20
See application file for complete search history.

(56) References Cited

U.S. PATENT DOCUMENTS

| | | | | |
|---|---|---|---|---|
| 5,456,465 A | 10/1995 | Durham | | |
| 6,004,207 A | 12/1999 | Wilson, Jr. et al. | | |
| 6,419,579 B1 | 7/2002 | Bennett | | |
| 6,439,993 B1 * | 8/2002 | O'Halloran | 463/16 | |
| 6,558,253 B1 | 5/2003 | DeSimone et al. | | |
| 6,561,904 B2 | 5/2003 | Locke et al. | | |
| 6,648,758 B2 | 11/2003 | Bennett et al. | | |
| 6,971,954 B2 | 12/2005 | Randall et al. | | |
| 7,029,396 B2 | 4/2006 | Jaffe et al. | | |
| 7,112,136 B2 | 9/2006 | Anderson et al. | | |
| 7,819,737 B2 | 10/2010 | Englman et al. | | |
| 7,819,740 B2 | 10/2010 | Masci et al. | | |
| 7,883,406 B2 | 2/2011 | Vancura | | |
| 7,896,737 B2 | 3/2011 | Gauselmann | | |
| 7,959,504 B2 * | 6/2011 | Baumgartner et al. | 463/20 | |
| 2003/0130030 A1 | 7/2003 | Delott et al. | | |
| 2004/0092300 A1 * | 5/2004 | Gauselmann | 463/16 | |
| 2004/0092302 A1 * | 5/2004 | Gauselmann | 463/20 | |
| 2004/0097279 A1 * | 5/2004 | Gauselmann | 463/16 | |
| 2004/0097280 A1 * | 5/2004 | Gauselmann | 463/16 | |
| 2007/0105611 A1 | 5/2007 | O'Halloran | | |
| 2008/0132309 A1 * | 6/2008 | Baumgartner et al. | 463/16 | |
| 2008/0234033 A1 | 9/2008 | Berman et al. | | |
| 2009/0054129 A1 | 2/2009 | Yoshimura et al. | | |
| 2009/0143134 A1 | 6/2009 | Anderson et al. | | |
| 2009/0227356 A1 | 9/2009 | Moroney | | |
| 2010/0137055 A1 | 6/2010 | Jaffe | | |
| 2010/0210343 A1 | 8/2010 | Englman et al. | | |
| 2010/0240439 A1 | 9/2010 | Englman et al. | | |
| 2011/0045892 A1 | 2/2011 | Vann et al. | | |

* cited by examiner

*Primary Examiner* — Masud Ahmed
(74) *Attorney, Agent, or Firm* — Nixon Peabody LLP

(57) ABSTRACT

A gaming system comprises at least one input device, at least one display device, at least one processor, and at least one memory device. The memory device stores a plurality of instructions which, when executed by the at least one processor, cause the at least one processor to operate with the at least one display device and the at least one input device to receive a wager to play a wagering game, display an array of symbols randomly selected from a plurality of possible symbols, trigger a bonus feature if the displayed array includes a bonus triggering outcome, and, in response to the displayed array including at least one bonus triggering symbol, change one or more of the symbols adjacent to the bonus triggering symbol to respective other symbols selected from the plurality of possible symbols, and awarding an enhanced award that is greater than a basic award resulting from the bonus feature and any winning combinations of the symbols in the displayed array. The basic award is otherwise provided when the at least one bonus triggering symbol is absent from the displayed array.

21 Claims, 8 Drawing Sheets

GAMING SYSTEM AND METHOD WITH AWARD ENHANCING SYMBOL

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems and methods and, more particularly, to a gaming system and computer-implemented method for conducting a wagering game.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

According to one aspect of the present invention, a gaming system comprises at least one input device, at least one display device, at least one processor, and at least one memory device. The memory device stores a plurality of instructions which, when executed by the at least one processor, cause the at least one processor to operate with the at least one display device and the at least one input device to receive a wager to play a wagering game, display an array of symbols randomly selected from a plurality of possible symbols, trigger a bonus feature if the displayed array includes a bonus triggering outcome, and, in response to the displayed array including at least one special symbol, change one or more of the symbols adjacent to the special symbol to respective other symbols selected from the plurality of possible symbols, and award an enhanced award that is greater than a basic award that would otherwise result from the bonus feature and any winning combinations of the symbols in the displayed array.

According to another aspect of the present invention, a gaming device under control of at least one processor, comprises at least one input device, at least one display device, and at least one memory device. The memory device is configured to store a plurality of instructions which, when executed by the at least one processor, cause the at least one processor to operate with the at least one display device and the at least one input device to receive a wager to play a wagering game, display an array of symbols randomly selected from a plurality of possible symbols, and, in response to the displayed array not including at least one bonus triggering symbol, award basic awards for any winning combinations of the symbols in the displayed array, and in response to the displayed array including the at least one bonus triggering symbol, change one or more of the symbols adjacent to the bonus triggering symbol to respective other symbols selected from the plurality of possible symbols, trigger a bonus feature if the displayed array includes a bonus triggering outcome, and increase an award resulting from the bonus feature and the basic awards for any winning combinations of the symbols in the displayed array.

According to yet another aspect of the present invention, a method for a gaming system comprises receiving a wager to play a wagering game, displaying an array of symbols randomly selected from a plurality of possible symbols, and triggering a bonus feature if the displayed array includes a bonus triggering outcome. In response to the displayed array including at least one special symbol, one or more of the symbols adjacent to the special symbol are changed to respective other symbols selected from the plurality of possible symbols, and an enhanced award is awarded that is greater than a basic award otherwise resulting from the bonus feature and any winning combinations of the symbols in the displayed array.

According to another aspect of the present invention, a method comprises receiving a wager to play a wagering game and displaying an array of symbols randomly selected from a plurality of possible symbols. in response to the displayed array including at least one special symbol, one or more of the symbols adjacent to the special symbol are changed to respective other symbols randomly selected from the plurality of possible symbols, a bonus feature is triggered if the displayed array includes a bonus triggering outcome, and an enhanced award is awarded that is greater than a basic award resulting from the bonus feature and any winning combinations of the symbols in the displayed array. The basic award is otherwise provided when the at least one special symbol is absent from the displayed array.

According to a further aspect of the present disclosure, one or more non-transitory computer readable storage media are encoded with instructions, which when executed by at least one processor or controller associated with a gaming system, causes the at least one processor or controller to perform the above methods.

Additional aspects of the invention will be apparent to those of ordinary skill in the art in view of the detailed description of various embodiments, which is made with reference to the drawings, a brief description of which is provided below.

Figure 1:
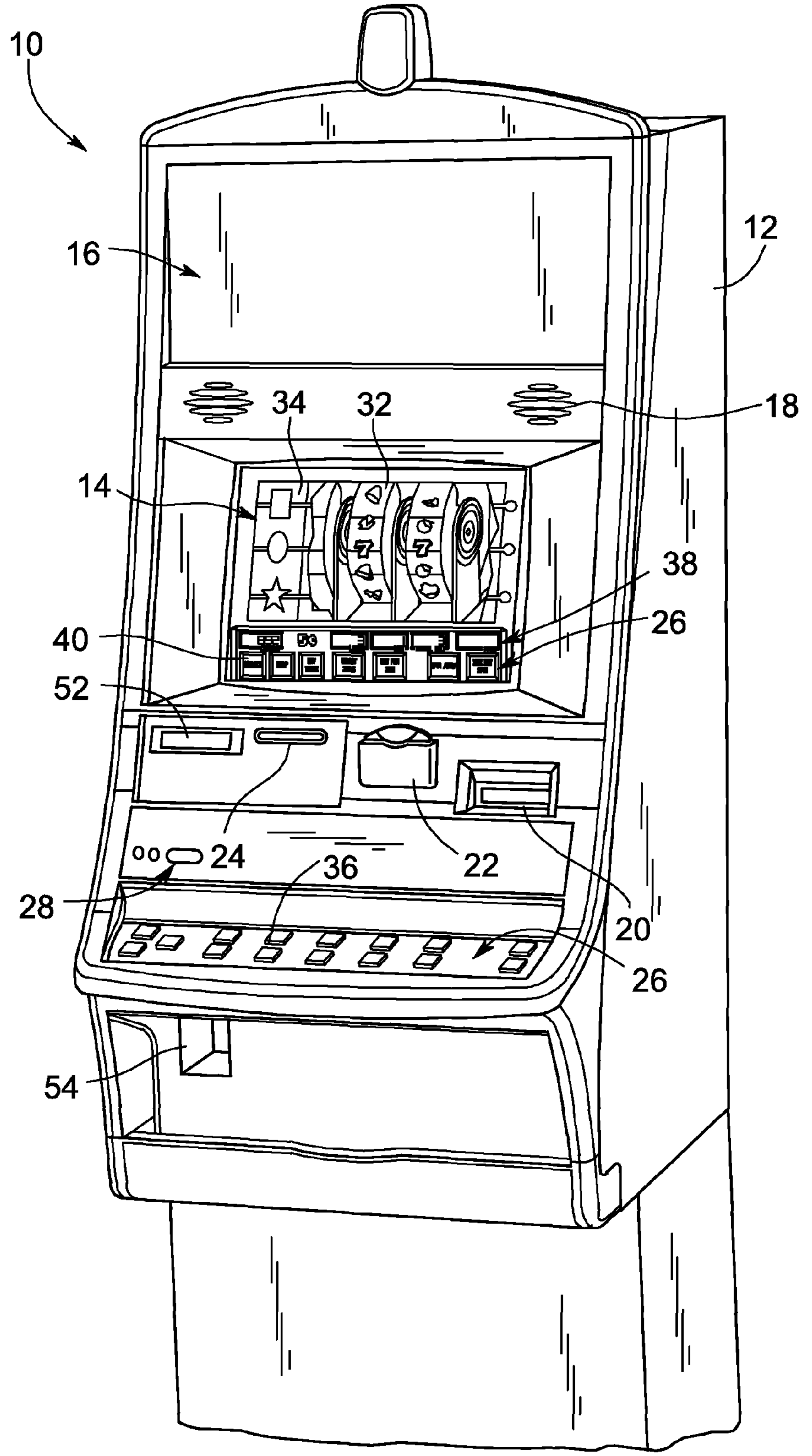
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
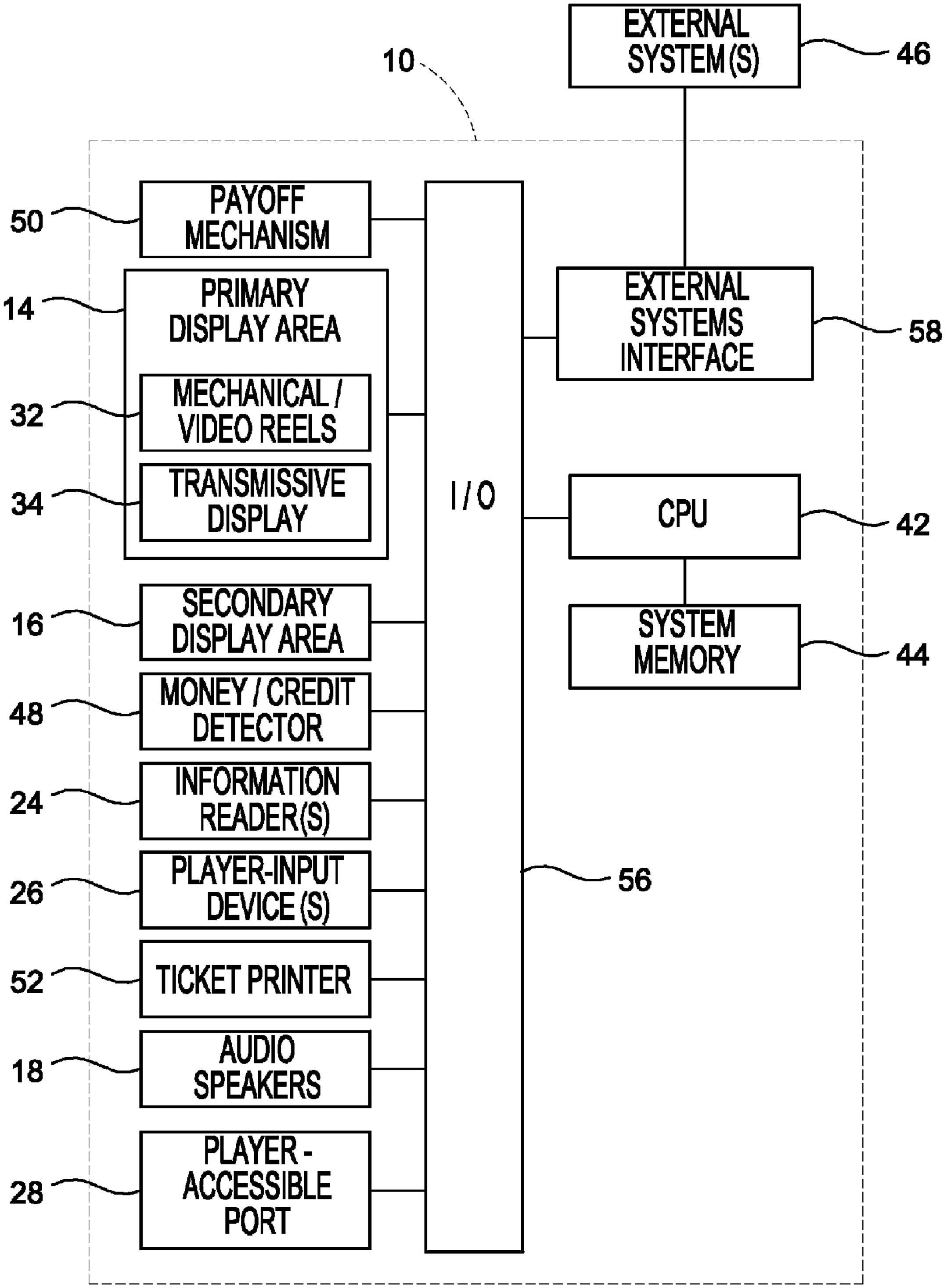
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal to the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
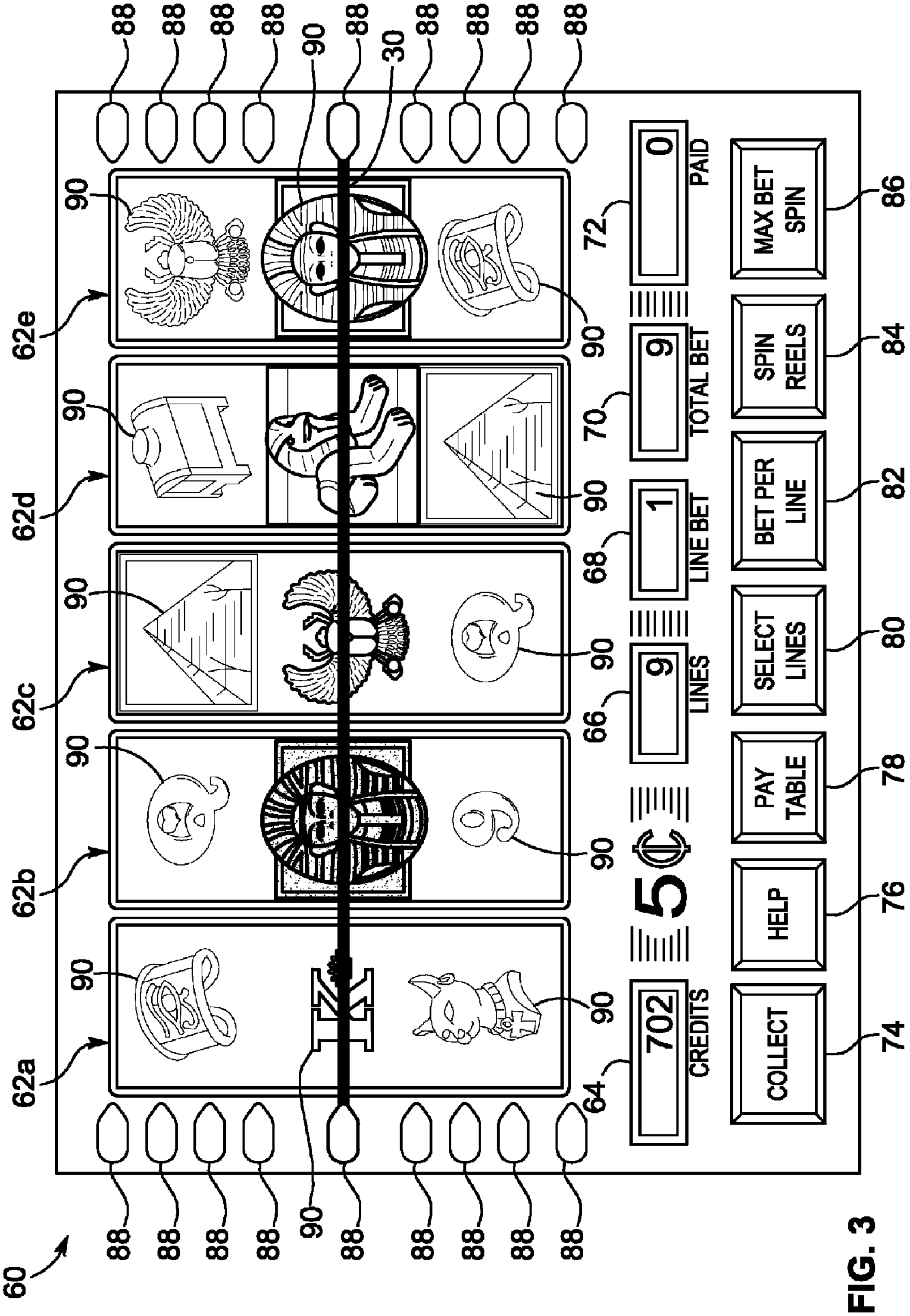
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to process the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e* (e.g., symbol-bearing reels). Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines such as payline 30 extend from one of the exemplary payline indicators 88 on the left side of the basic-game screen 60 to a corresponding one of the exemplary payline indicators 88 on the right side of the screen 60. A plurality of exemplary symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine left-to-right paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
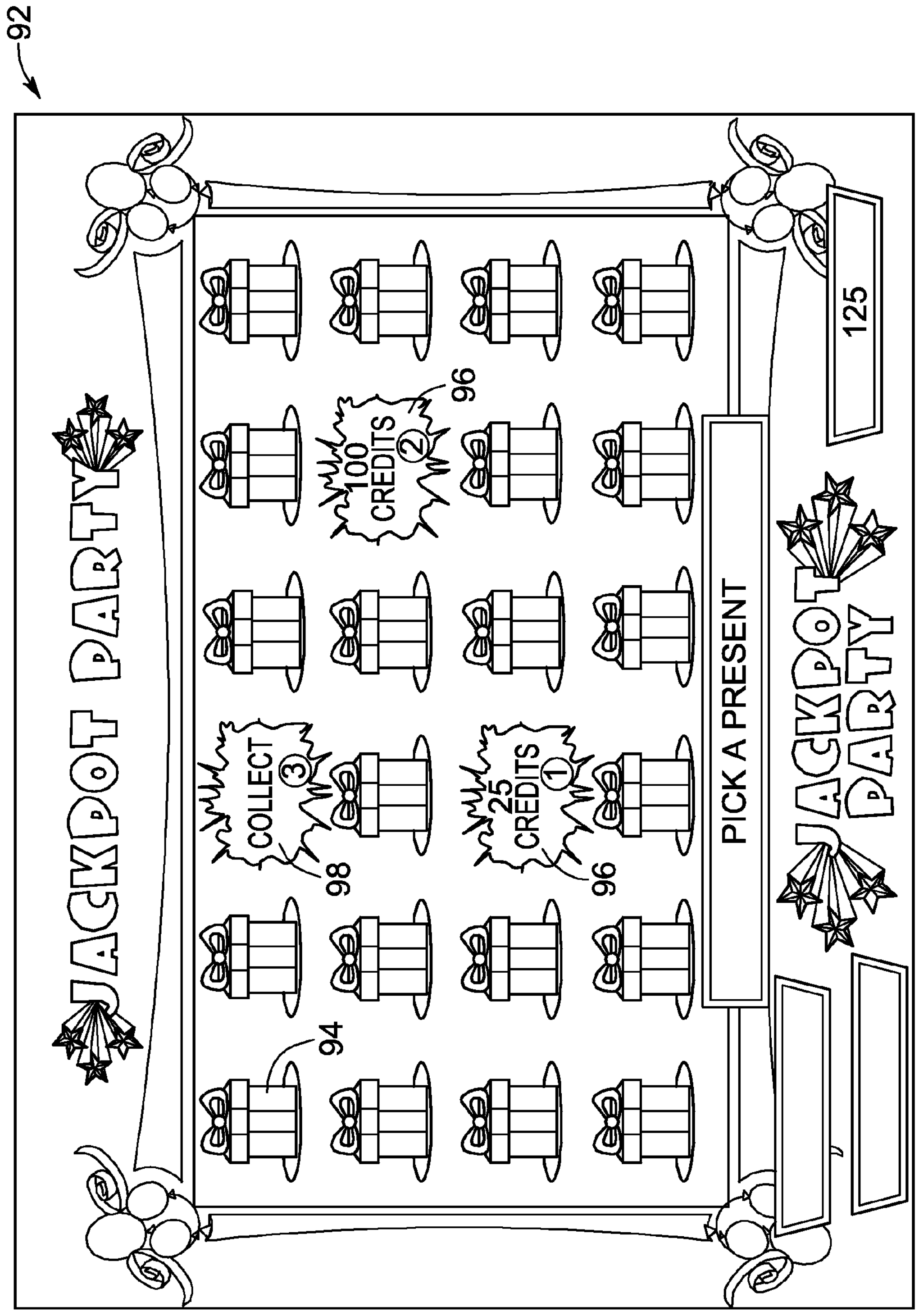
FIG. 4 (PRIOR ART)
FIG. 4 is an image of a bonus-game screen of an exemplary wagering game displayed on a gaming terminal, according to an embodiment of the present invention.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated, the accumulated award outcomes 96 are provided to the player, and operation returns to the basic wagering game.

The wagering game may include a single bonus game or multiple bonus games. Each bonus game may be triggered by the occurrence of a respective start-bonus outcome in or during the basic wagering game. Alternatively or in addition, each bonus game may be triggered by the occurrence of a start-bonus outcome in or during another one of the bonus games such that one bonus game leads to another bonus game. The bonus games may be similar or different in format and may occupy the primary display area 14, the secondary display area 16, or a combination thereof.

Figure 5:
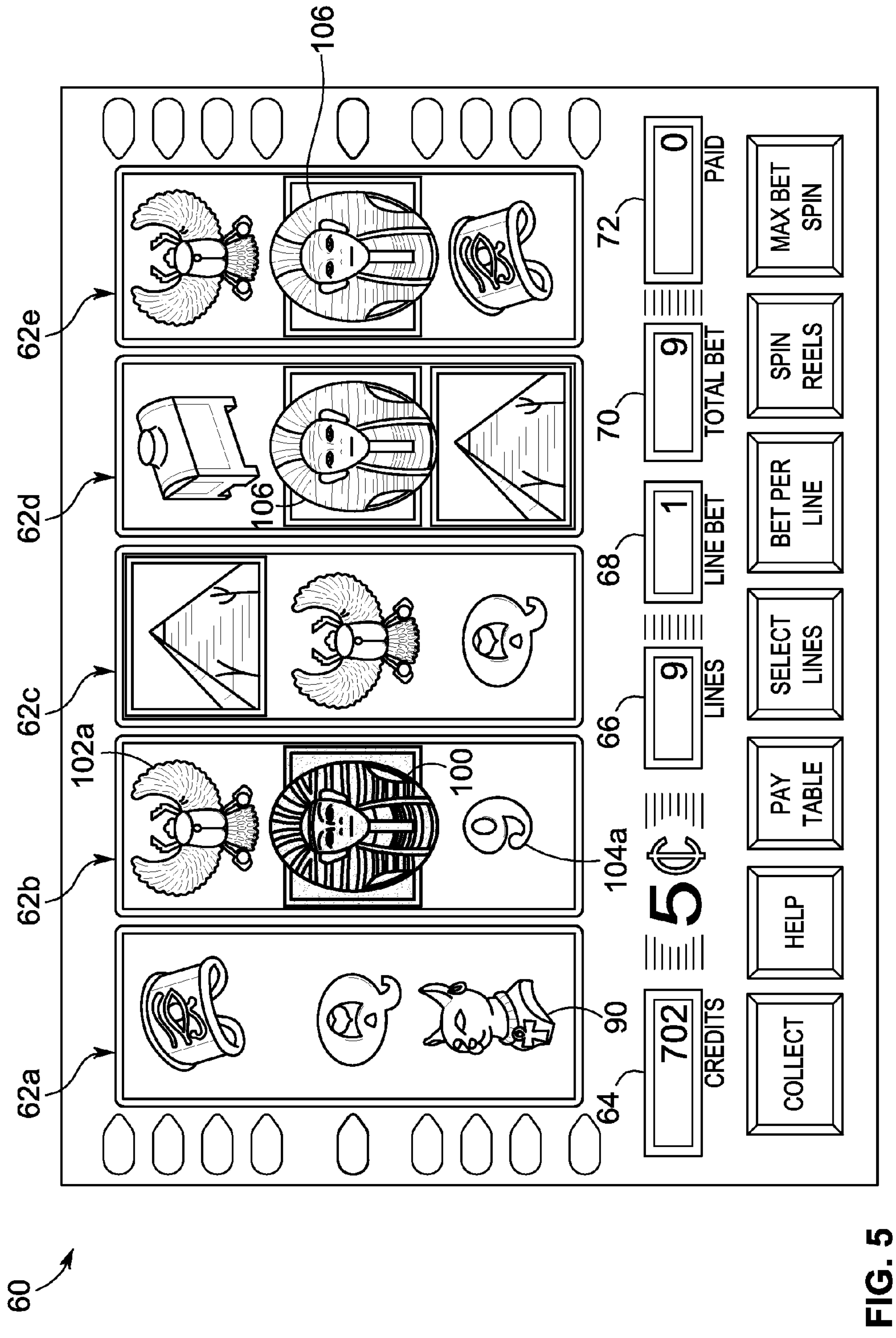
FIGS. 5 and 6 are additional images of a basic-game screen of a wagering game displayed on a gaming terminal, according to an embodiment of the present invention.
Figure 6:
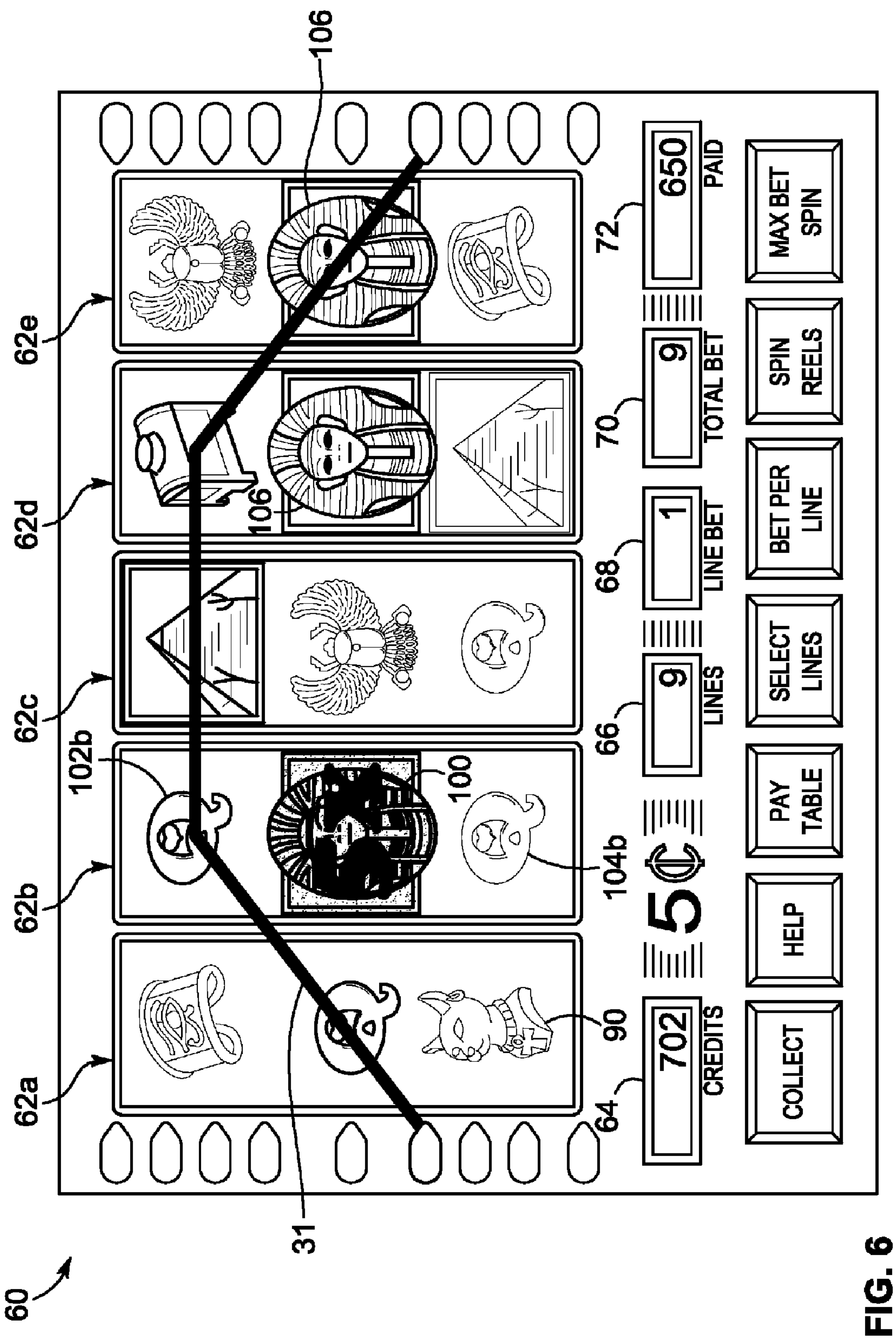

Referring now to FIGS. 5 and 6, there are shown a sequence of two images of an exemplary basic-game screen 60 of a wagering game displayed in the primary display area of the gaming terminal, according to an embodiment of the present invention. Referring to FIG. 5, in response to a wager placed via an input device, the reels 62*a-e* are spun and stopped to display a plurality of symbols, such as three symbols, on each reel in the primary display area. The displayed symbols form an array. In the illustrated example, the reels may stop with a special bonus triggering symbol 100 in the displayed array and with symbols 102*a* and 104*a* vertically adjacent to (i.e., on the same reel 62*b* as) the bonus triggering symbol 100. The wagering game may be designed such that the special bonus triggering symbol 100 can appear in the displayed array on any reel or only on certain of the reels 62*a-e*.

Referring to FIG. 6, in response to the displayed array including the special bonus triggering symbol 100, the symbols 102*a* and 104*a* in FIG. 5 are changed to respective other symbols 102*b* and 104*b* randomly selected from the symbols available in the wagering game. This change or transformation may occur before or after the reel 62*b* containing the bonus triggering symbol 100 has stopped to display the bonus triggering symbol 100 in the displayed array. If the change occurs before the reel 62*b* has stopped, the symbol change is visually hidden from the player, and the variability of the symbols vertically adjacent to the bonus triggering symbol 100 is not readily apparent to the player. If, however, the change occurs after the reel 62*b* has stopped as shown in FIGS. 5 and 6, the symbol change is visually apparent to the player. Alternatively or in addition, other symbols horizontally and/or diagonally adjacent to the special bonus triggering symbol 100 may undergo a random transformation akin to the change of symbols 102*a* and 104*a* to respective randomly selected symbols 102*b* and 104*b*.

In the illustrated example, the occurrence of the special bonus triggering symbol 100 may, by itself or in combination with other standard bonus triggering symbols 106 (depending upon the rules of the wagering game), trigger a bonus game. If the game rules require the occurrence of the combination to trigger a bonus game, the rules may or may not further require the combination to appear along an active payline to act as a bonus trigger. The bonus game may be of a first type played directly on the displayed array (e.g., free spins of the reels) or, as shown in FIG. 4, of a second type played independently of the displayed array. The second type of bonus game may be played on the primary display area 14 (with the displayed array temporarily removed from the screen), the secondary display area 16, or combination thereof.

Figure 7:
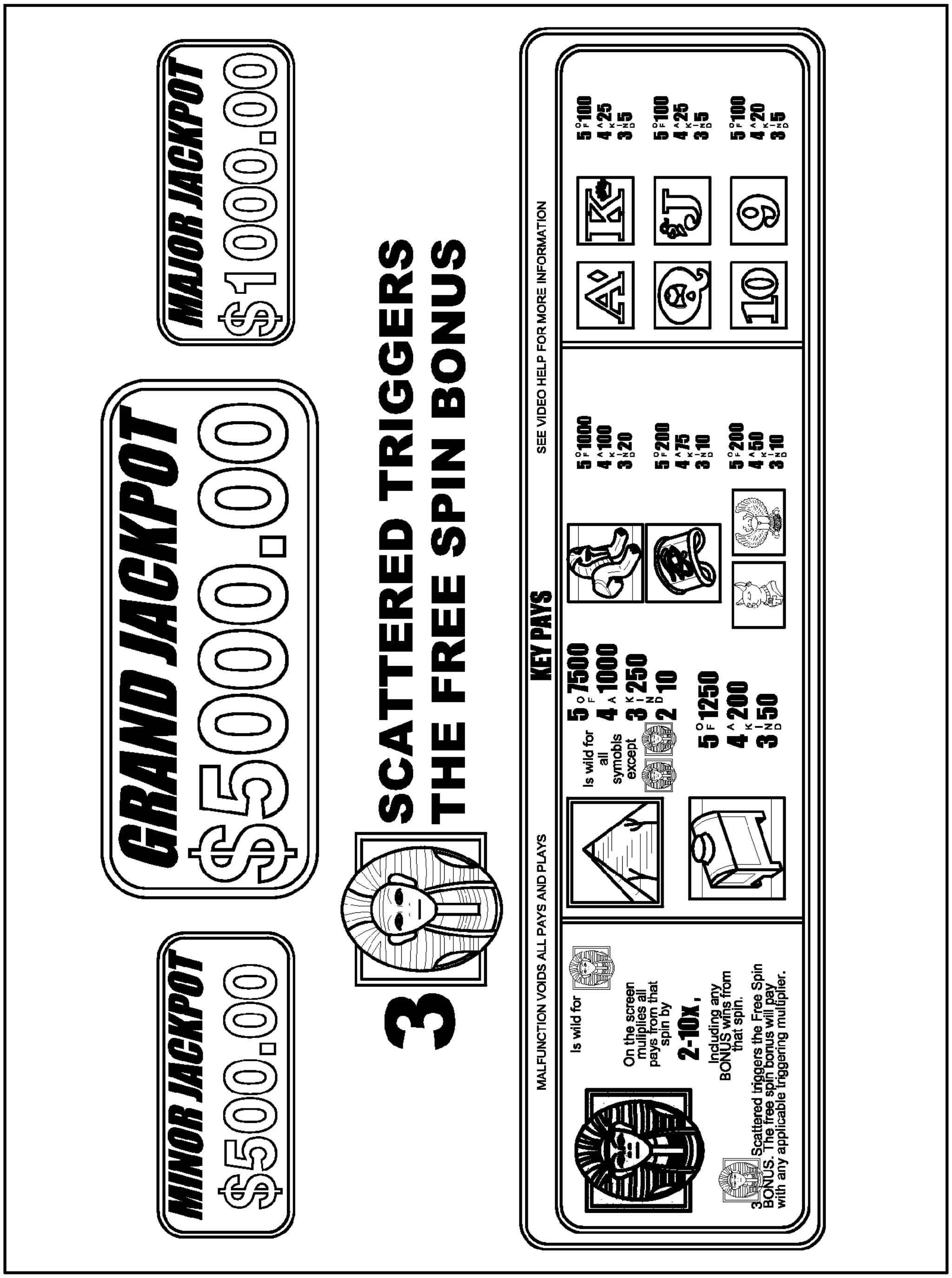
FIG. 7 is an image of a pay table of a wagering game displayed on a gaming terminal, according to an embodiment of the present invention.

After the reels 62*a-e* have spun and stopped and any symbol change associated with the appearance of the special bonus triggering symbol 100 in the display array has occurred, the wagering game awards the player for any line pays, scatter pays, and triggered bonus games. In the absence of the special bonus triggering symbol 100 from the displayed array, the player is merely awarded a basic award resulting from such line pays, scatter pays, and triggered bonus games. The basic award may be set forth in a basic pay table as shown in FIG. 7.

If, however, the special bonus triggering symbol 100 appears in the displayed array, the player is awarded an enhanced award resulting from any line pays, scatter pays, and triggered bonus games. For example, if the displayed array only yields line pays or scatter pays, then those pays are enhanced. If the displayed array yields both line or scatter pays and a triggered bonus game, then both the line/scatter pays and bonus game payoffs are enhanced. The enhanced award may, for example, be a fixed or randomly selected multiple of the basic award wherein the special bonus triggering symbol 100 effectively acts as a spin multiplier. In an alternative embodiment, the enhanced award may be based on an enhanced pay table that has higher pays than the basic pay table shown in FIG. 7. In a further embodiment, the enhanced award may be a predetermined or random credit amount or game play feature added to the basic award for each line pay, scatter pay, and triggered bonus game.

In the example illustrated in FIG. 6, the enhanced award is a multiple of five (5×) applied to the basic award, and the displayed array yields both (i) a line pay along payline 31 of two QUEEN symbols and a wild PYRAMID symbol and (ii) a bonus game triggered by the special bonus triggering symbol 100 and the two standard bonus triggering symbols 106. According to FIG. 7, the basic line pay award for three QUEEN symbols is 5 credits per line bet credit. If the player wagered 1 credit per line and the triggered bonus game yielded a basic award of 125 credits as shown in FIG. 4, the player would be awarded 25 credits (i.e., 5×5) for the line pay and 625 credits (i.e., 5×125) for the bonus game, yielding a cumulative enhanced award of 650 credits.

In accordance with an embodiment of the present invention, if the symbol change resulting from the occurrence of the special bonus triggering symbol 100 in the displayed array occurs after the reel 62*b* containing the bonus triggering symbol 100 has stopped, the player is preferably also awarded a basic award resulting from any line pays, scatter pays, and bonus triggers that appear in the displayed array prior to the symbol change. A benefit of awarding the basic award prior to the symbol change is that the player will not feel cheated out of any line pays, scatter pays, and bonus triggers that may appear in the displayed array before, but not after, the symbol change.

A benefit of the aforementioned symbol change feature wherein one or more symbols adjacent to the special bonus triggering symbol 100 are variable is that such symbol change feature allows for a variety of line and scatter pays when the symbol 100 appears in the displayed array. If the symbols adjacent to the special bonus triggering symbol 100 were otherwise static, the types of line and scatter pays would be constrained by such static symbols when the symbol 100 appears in the displayed array. With respect to line pays, for example, many paylines "extend through" the symbols adjacent to the special bonus triggering symbol 100. By making such adjacent symbols variable, the player can potentially achieve line and scatter pays with any of the symbols resulting from the symbol change.

In one embodiment, the special bonus triggering symbol 100 is a wild symbol that can act as one or more of the other symbols in the displayed array to create line pays and/or scatter pays. In another embodiment, the special symbol 100 does not operate as a bonus triggering symbol but still operates to enhance, e.g., multiply, the basic award resulting from any line pays, scatter pays, and triggered bonus games. The vertically adjacent symbols, e.g., symbols 102*a* and 104*a* in FIG. 5, may be permitted to change into bonus triggering symbols 106 as one of the symbol choices in order to trigger a bonus game via the symbol change feature. In a further embodiment, the wagering game is provided with a sixth reel to the right of reels 62*a-e*, and the special bonus triggering symbol 100 is among the symbols that can be displayed from that reel.

Figure 8:
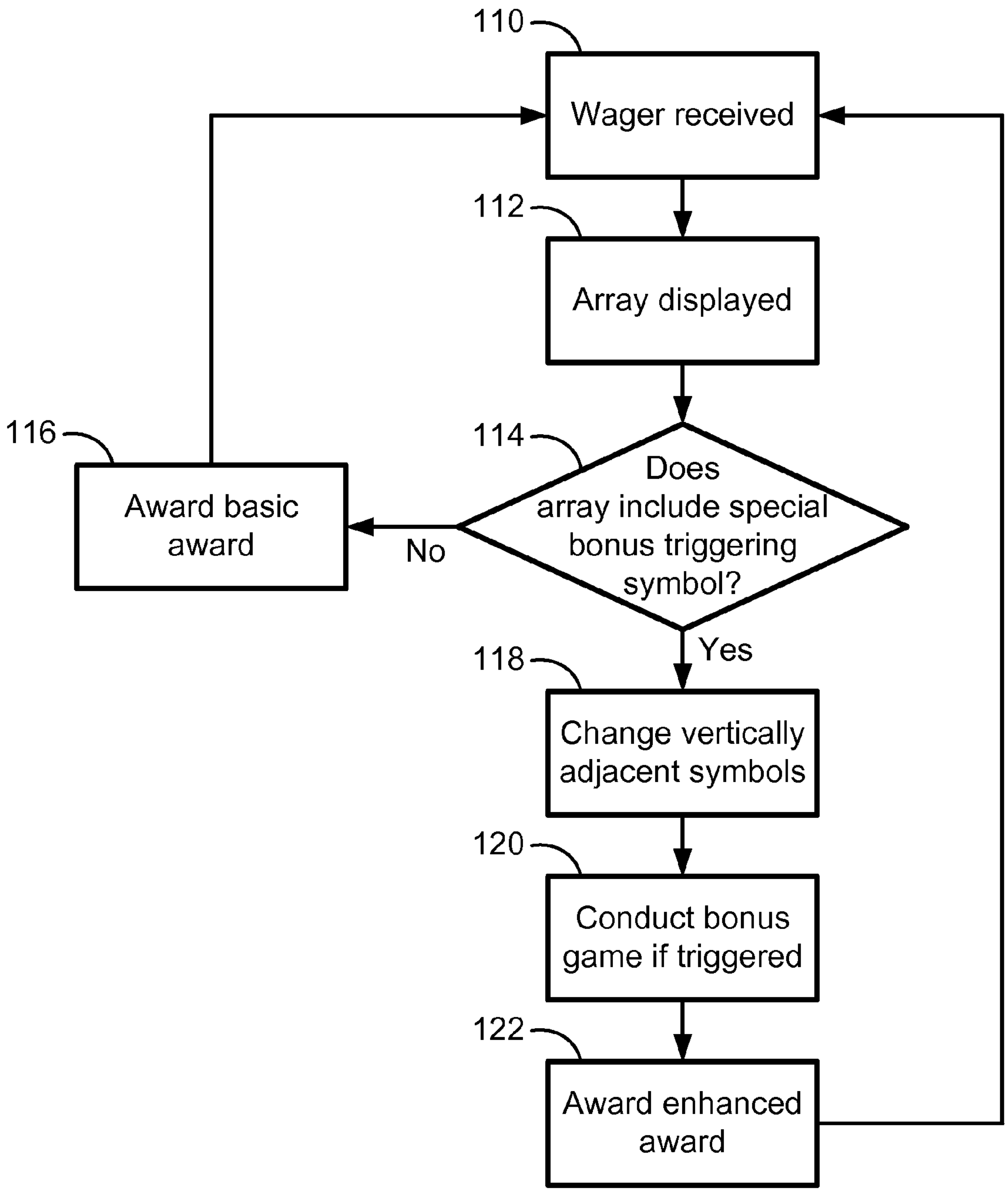
FIG. 8 is a flowchart for an algorithm that corresponds to instructions executed by a controller in accord with at least some aspects of the disclosed concepts.

FIG. 8, described by way of example above, represents one algorithm that corresponds to at least some instructions executed by the controller 42 and/or external systems 46 in FIG. 2 to perform the above described functions associated with the disclosed concepts. At step 110, a wager to play a wagering game is received via an input device. At step 112, an array of symbols randomly selected from a plurality of possible symbols is displayed on at least one display device. This step may be accomplished by spinning and stopped a plurality of symbol-bearing reels. At step 114, it is determined whether or not the displayed array includes at least one special bonus triggering symbol. If the answer at step 114 is no, the wagering game awards a basic award for any winning combinations of the symbols in the displayed array and for any triggered bonus features at step 116, and operation then returns to step 110 for another play of the wagering game.

If the answer at step 114 is yes, one or more of the symbols adjacent (e.g., horizontal, vertical, diagonal) to the special bonus triggering symbol are changed to respective other symbols randomly selected from the plurality of possible symbols at step 118. The changed symbols are preferably vertically adjacent to (i.e., on the same reel as) as the special bonus triggering symbol. Also, a bonus feature is triggered at step 120 if the displayed array includes a bonus triggering outcome. The bonus triggering outcome may comprise the special bonus triggering symbol by itself or in combination with other standard bonus triggering symbols 106 (depending upon the rules of the wagering game). It is contemplated that the bonus feature can instead or also be triggered between step 112 and step 114. Next, at step 122, the wagering game awards an enhanced award for any winning combinations of the symbols in the displayed array and for any triggered bonus features, and operation then returns to step 110 for another play of the wagering game. It is contemplated that the enhanced award is greater than a basic award that would otherwise result from the winning combinations and the bonus features. The enhanced award is preferably a randomly selected multiple of the basic award.

In certain aspects a gaming system can comprise at least one input device, at least one display device, at least one processor, and at least one memory device. The memory device stores a plurality of instructions which, when executed by the at least one processor, cause the at least one processor to operate with the at least one display device and the at least one input device to receive a wager to play a wagering game, display an array of symbols randomly selected from a plurality of possible symbols, and, in response to the displayed array including at least one special symbol, change one or more of the symbols adjacent to the special symbol to respective other symbols selected from the plurality of possible symbols, trigger a bonus feature if the displayed array includes a bonus triggering outcome, and enhance a basic award resulting from the bonus feature and any winning combinations of the symbols in the displayed array. The basic award is otherwise provided when the at least one special symbol is absent from the displayed array.

Each of these embodiments and obvious variations thereof is contemplated as falling within the spirit and scope of the claimed invention, which is set forth in the following claims.

What is claimed is:

1. A gaming system comprising:

at least one input device;

at least one display device;

at least one processor; and at least one memory device storing a plurality of instructions which, when executed by the at least one processor, cause the at least one processor to operate with the at least one display device and the at least one input device to:

receive a wager to play a wagering game;

display an array of symbols randomly selected from a plurality of possible symbols;

trigger a bonus feature if the displayed array includes a bonus triggering outcome, the bonus feature being distinct from and being conducted subsequent to the display of the array of symbols; and in response to the displayed array including at least one special symbol, change one or more of the symbols adjacent to the special symbol to respective other symbols selected from the plurality of possible symbols, and awarding an enhanced award that is greater than a basic award otherwise resulting from the bonus feature and any winning combination(s) of the symbols in the displayed array.

2. The gaming system of claim 1, wherein the displayed array of symbols comprises a plurality of symbols on each of a plurality of symbol-bearing reels configured to be spun and stopped.

3. The gaming system of claim 2, wherein the changed symbols are on the same reel as the special symbol.

4. The gaming system of claim 2, wherein the at least one display device includes a video display, the plurality of symbol-bearing reels being simulated on the video display.

5. The gaming system of claim 1, wherein the enhanced award is a multiple of the basic award.

6. The gaming system of claim 1, wherein the respective other symbols to which the one or more symbols adjacent to the special symbol are changed are randomly selected from the plurality of possible symbols.

7. The gaming system of claim 1, wherein the bonus triggering outcome includes the at least one special symbol in the displayed array.

8. A gaming device under control of at least one processor, comprising:

at least one input device;

at least one display device;

at least one memory device configured to store a plurality of instructions which, when executed by the at least one processor, cause the at least one processor to operate with the at least one display device and the at least one input device to:

receive a wager to play a wagering game;

display an array of symbols randomly selected from a plurality of possible symbols; and in response to the displayed array not including at least one bonus triggering symbol, award basic awards for any winning combinations of the symbols in the displayed array; and in response to the displayed array including the at least one bonus triggering symbol, change one or more of the symbols adjacent to the bonus triggering symbol to respective other symbols selected from the plurality of possible symbols, trigger a bonus feature if the displayed array includes a bonus triggering outcome, the bonus feature being distinct from and being conducted subsequent to the display of the array of symbols, and increase an award resulting from the bonus feature and the basic awards for any winning combinations of the symbols in the displayed array.

9. The gaming device of claim 8, wherein the array of symbols comprises a plurality of symbols on each of a plurality of symbol-bearing reels configured to be spun and stopped, and wherein the changed symbols are on the same reel as the bonus triggering symbol.

10. A computer-implemented method in a gaming system, comprising:

receiving, via an input device, a wager to play a wagering game;

displaying, on at least one display device, an array of symbols randomly selected from a plurality of possible symbols;

triggering, by one or more processors, a bonus feature if the displayed array includes a bonus triggering outcome, the bonus feature being distinct from and being conducted subsequent to the displaying of the array of symbols; and in response to the displayed array including at least one special symbol, changing one or more of the symbols adjacent to the special symbol to respective other symbols selected from the plurality of possible symbols, and awarding, by one or more processors, an enhanced award that is greater than a basic award otherwise resulting from the bonus feature and any winning combinations of the symbols in the displayed array.

11. The method of claim 10, wherein the displaying includes spinning and stopping a plurality of symbol-bearing reels.

12. The method of claim 11, wherein the changed symbols are on the same reel as the special symbol.

13. The method of claim 11, wherein the at least one display device includes a video display, the plurality of symbol-bearing reels being simulated on the video display.

14. The method of claim 10, wherein the enhanced award is a multiple of the basic award.

15. The method of claim 14, wherein the changing includes changing the one or more of the symbols adjacent to the special symbol to respective other symbols randomly selected from the plurality of possible symbols.

16. The method of claim 10, wherein the bonus triggering outcome includes at least the special symbol in the displayed array.

17. One or more machine-readable, non-transitory storage media including instructions which, when executed by one or more processors, cause the one or more processors to perform operations comprising:

receiving, via an input device, a wager to play a wagering game;

displaying, on at least one display device, an array of symbols randomly selected from a plurality of possible symbols; and in response to the displayed array including at least one special symbol, changing one or more of the symbols adjacent to the special symbol to respective other symbols randomly selected from the plurality of possible symbols, triggering, by one or more processors, a bonus feature if the displayed array includes a bonus triggering outcome, the bonus feature being distinct from and being conducted subsequent to the displaying of the array of symbols, and awarding, by one or more processors, an enhanced award that is greater than a basic award resulting from the bonus feature and any winning combinations of the symbols in the displayed array, the basic award being otherwise provided when the at least one special symbol is absent from the displayed array.

18. The media of claim 17, wherein the displaying includes spinning and stopping a plurality of symbol-bearing reels, and wherein the changed symbols are on the same reel as the special symbol.

19. The media of claim 17, wherein the enhanced award is a randomly selected multiple of the basic award.

20. The media of claim 17, wherein the special symbol is a wild symbol that can act as one or more of the displayed symbols to create the winning combinations.

21. The media of claim 17, wherein the bonus triggering outcome includes at least the special symbol in the displayed array.

* * * * *